(12) United States Patent
Alvarez et al.

(10) Patent No.: US 12,331,469 B2
(45) Date of Patent: Jun. 17, 2025

(54) ARTIFICIAL TURF YARN WITH IMPROVED PROCESSIBILITY AND FRICTION MANAGEMENT

(71) Applicant: Multibase Inc., Copley, OH (US)

(72) Inventors: Eduardo Alvarez, Tarragona (ES); David Lopez, Tarragona (ES); Cosme Llop, Tarragona (ES); Thibault Kervyn De Meerendre, Seneffe (BE); Celine Chevallier, Annecy (FR)

(73) Assignee: Multibase Inc., Copley, OH (US)

( * ) Notice: Subject to any disclaimer, the term of this patent is extended or adjusted under 35 U.S.C. 154(b) by 975 days.

(21) Appl. No.: 17/049,415

(22) PCT Filed: May 3, 2019

(86) PCT No.: PCT/US2019/030604
§ 371 (c)(1),
(2) Date: Oct. 21, 2020

(87) PCT Pub. No.: WO2019/213524
PCT Pub. Date: Nov. 7, 2019

(65) Prior Publication Data
US 2021/0238811 A1 Aug. 5, 2021

(30) Foreign Application Priority Data
May 3, 2018 (EP) .................................... 18382307

(51) Int. Cl.
*E01C 13/08* (2006.01)
*C08L 23/08* (2025.01)
(Continued)

(52) U.S. Cl.
CPC .............. *E01C 13/08* (2013.01); *C08L 23/08* (2013.01); *C08L 83/04* (2013.01); *D01F 6/30* (2013.01); *D01F 6/46* (2013.01)

(58) Field of Classification Search
None
See application file for complete search history.

(56) References Cited

U.S. PATENT DOCUMENTS 3,645,992 A   2/1972  Elston
3,914,342 A  10/1975  Mitchell
(Continued)

FOREIGN PATENT DOCUMENTS

CN  103282563 A  9/2013
CN  103998659 A  8/2014
(Continued)

OTHER PUBLICATIONS

Machine Translation of CN 104532383 (Year: 2015).*
(Continued)

*Primary Examiner* — Shawn Mckinnon
(74) *Attorney, Agent, or Firm* — Lorenz & Kopf LLP

(57) ABSTRACT

Embodiments of the present disclosure are directed to an artificial turf filament formed from a formulation comprising an ethylene-based polymer having a density 0.900 g/c to 0.955 g/cc and a melt index (I2) of 0.1 g/10 min to 20 g/10 min as measured according to ASTM D1238 (at 190 C, 2.16 kg), and one or more polydimethylsiloxane (PDMS) components having a number average molecular weight (Mn) of from 10,000 g/mol to 500,000 g/mol, wherein the Mn is measured by Gel Permeation Chromatography (GPC).

19 Claims, 1 Drawing Sheet

(51) Int. Cl.
*C08L 83/04* (2006.01)
*D01F 6/30* (2006.01)
*D01F 6/46* (2006.01)

(56) References Cited

U.S. PATENT DOCUMENTS

| | | | |
|---|---|---|---|
| 4,076,698 A | | 2/1978 | Anderson et al. |
| 4,599,392 A | | 7/1986 | McKinney et al. |
| 5,171,464 A | | 12/1992 | de Montigny et al. |
| 5,272,236 A | | 12/1993 | Lai et al. |
| 5,278,272 A | | 1/1994 | Lai et al. |
| 5,582,923 A | | 12/1996 | Kale et al. |
| 5,733,155 A | | 3/1998 | Sagawa |
| 5,854,045 A | | 12/1998 | Fang et al. |
| 5,902,854 A | * | 5/1999 | Kelley ............... C08L 23/04 |
| | | | 524/427 |
| 6,074,762 A | | 6/2000 | Cretekos et al. |
| 6,080,489 A | * | 6/2000 | Mehta ............... C08L 23/10 |
| | | | 428/447 |
| 6,153,680 A | | 11/2000 | Shah et al. |
| 6,187,424 B1 | | 2/2001 | Kjellqvist et al. |
| 6,767,931 B2 | | 7/2004 | Martinez et al. |
| 8,043,696 B2 | | 10/2011 | Chen et al. |
| 2006/0057412 A1 | | 3/2006 | Jacob et al. |
| 2011/0117318 A1 | | 5/2011 | Zuercher et al. |
| 2013/0030123 A1 | * | 1/2013 | Martin ............... E01C 13/08 |
| | | | 525/95 |
| 2014/0206802 A1 | | 7/2014 | Bahn et al. |
| 2015/0056457 A1 | | 2/2015 | Kerstetter, III et al. |
| 2017/0342221 A1 | | 11/2017 | Geck et al. |
| 2020/0331241 A1 | | 10/2020 | Chevallier et al. |

FOREIGN PATENT DOCUMENTS

| | | | |
|---|---|---|---|
| CN | 104204115 A | | 12/2014 |
| CN | 104321378 A | | 1/2015 |
| CN | 104532383 | * | 4/2015 |
| CN | 104532383 A | | 4/2015 |
| CN | 106103577 A | | 11/2016 |
| CN | 106460238 A | | 2/2017 |
| CN | 107208320 A | | 9/2017 |
| JP | 10183518 | | 7/1998 |
| WO | 2006047374 A1 | | 5/2006 |
| WO | 2006047376 A1 | | 5/2006 |
| WO | 2006060826 A1 | | 6/2006 |
| WO | 2010077480 A1 | | 7/2010 |
| WO | 2011126886 A1 | | 10/2011 |
| WO | 2013188076 A1 | | 12/2013 |

OTHER PUBLICATIONS

International Search Report and Written Opinion pertaining to PCT/US2019/030604, dated Jul. 10, 2019, 8 pages.
Extended European Search Report pertaining to corresponding European Patent Application No. 18382307.9, dated Oct. 11, 2018, 4 pages.
Williams et al., "The Construction of a Polyethylene Calibration Curve for Gel Permeation Chromatography Using Polystyrene Fractions", Polymer Letters, 1968, vol. 6, pp. 621-624.
Chinese Office Action dated Jan. 18, 2023 for related Chinese Patent Application 201980028307.3 (13 total pages with English translation).

* cited by examiner

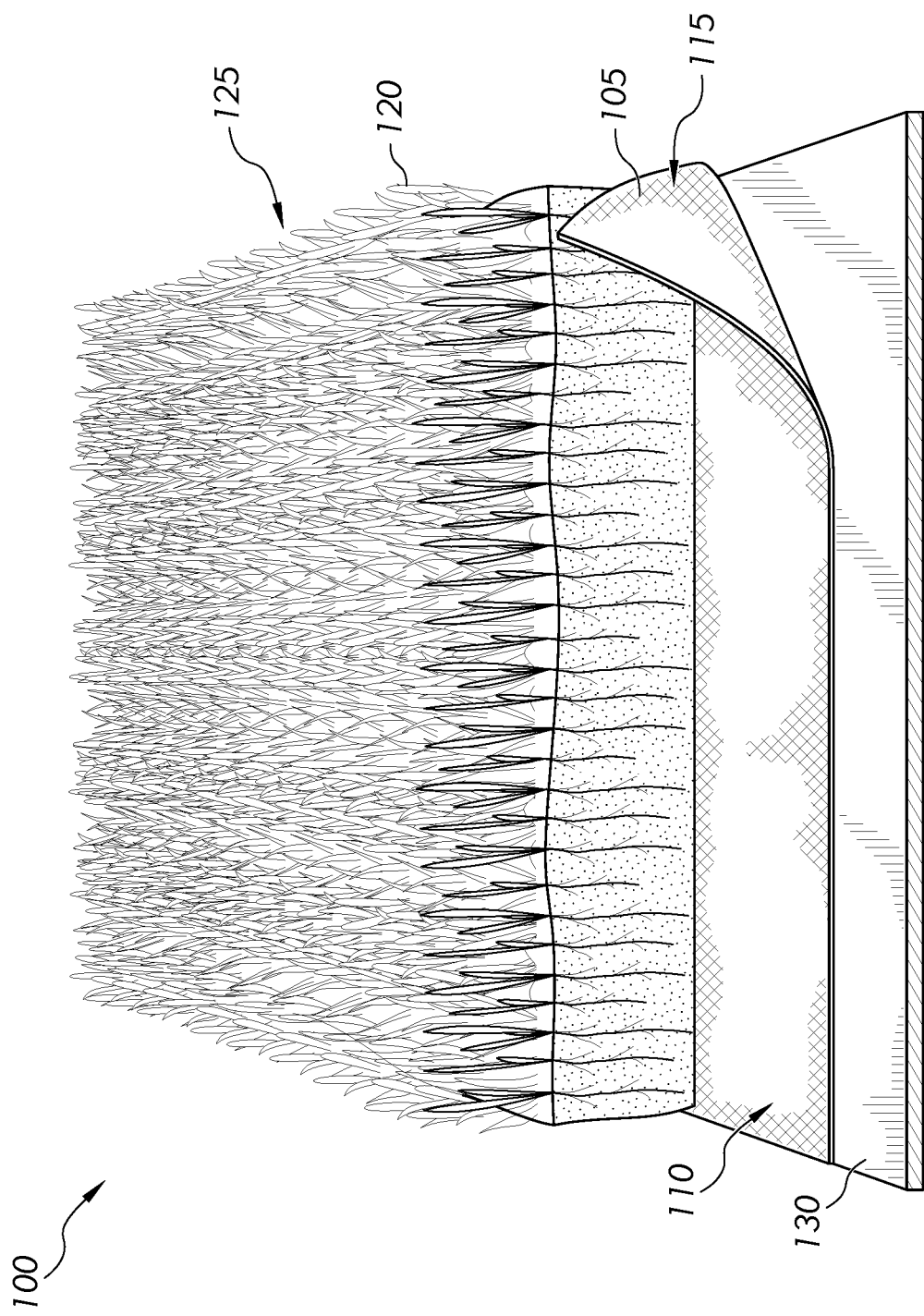

ARTIFICIAL TURF YARN WITH IMPROVED PROCESSIBILITY AND FRICTION MANAGEMENT

CROSS-REFERENCE TO RELATED APPLICATIONS

This application is a National Stage Entry under 35 U.S.C. § 371 of International Patent Application No. PCT/US2019/030604, filed May 3, 2019, which claims priority to European Patent Application No. 18382307.9, filed May 3, 2018, both of which are herein incorporated by reference in their entireties.

TECHNICAL FIELD

Embodiments of the present disclosure generally relate to article turf filaments, and artificial turf incorporating the artificial turf filaments.

BACKGROUND

Current artificial turf fields comprise polyethylene fibers, called yarn, that mimic real grass blades. The performance of the whole turf system is highly determined by the yarn. The fibers are tufted to a primary backing and coated with a secondary backing to keep yarn distributed and fixed. A granular infill is spread over the pitch to maintain yarn in upright position and provide shock absorption.

A concern of artificial turf is the increased incidences of human skin abrasions compared to playing on natural grass. Another important issue related to friction management in artificial turf is the ball roll in certain sports. For instance, to ensure adequate ball roll in hockey the artificial turf field needs to be watered, thus lowering the friction between the ball and the yarn. The amount of water used for this purpose is also significantly high (around 18,000 liters of water per match). Accordingly, there is a continual need for improved artificial turf that reduces skin abrasions and minimizes rolling friction.

SUMMARY

Embodiments of the present disclosure meet this need by including a formulation that offers improved friction management for artificial turf, specifically, delivering reduced human skin abrasion and improved ball roll. The present formulation blends high and/or ultra-high molecular weight polydimethylsiloxane (PDMS) polymer with the base ethylene-based polymer in order to obtain a low coefficient of friction in the artificial turf surface.

In addition to the skin abrasion and ball roll (reduced water) benefits, the present formulation provides enhanced processability during monofilament yarn extrusion. The broader annealing window enables higher line speeds with controlled shrinkage.

According to one embodiment, an artificial turf filament formed from a formulation is provided, the formulation comprising: an ethylene-based polymer having a density 0.900 g/c to 0.955 g/cc and a melt index ($I_2$) of 0.1 g/10 min to 20 g/10 min as measured according to ASTM D1238 (at 190° C., 2.16 kg), and one or more polydimethylsiloxane (PDMS) components having a number average molecular weight (Mn) of from 10,000 g/mol to 500,000 g/mol, wherein the $M_n$ is measured by Gel Permeation Chromatography (GPC).

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawing.

BRIEF DESCRIPTION OF THE DRAWING

FIG. 1 schematically depicts a cutaway view of an artificial turf field according to one or more embodiments shown and described herein.

DETAILED DESCRIPTION

Definitions

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer," which refers to polymers prepared from two or more different monomers. The term "interpolymer," as used herein, refers to a polymer prepared by the polymerization of at least two different types of monomers. The generic term interpolymer thus includes copolymers, and polymers prepared from more than two different types of monomers, such as terpolymers.

"Polyethylene" or "ethylene-based polymer" shall mean polymers comprising greater than 50% by mole of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "propylene-based polymer," as used herein, refers to a polymer that comprises, in polymerized form, greater than 50% by mole of units which have been derived from propylene monomer. This includes propylene homopolymer, random copolymer polypropylene, impact copolymer polypropylene, propylene/α-olefin interpolymer, and propylene/α-olefin copolymer.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.935 g/cc.

The term "LLDPE," includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts, and resins made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or U.S. Pat. No. 5,854,045). The LLDPE resins can be made via gas-phase, solution-phase, or slurry polymerization or any combination thereof, using any type of reactor or reactor configuration known in the art.

As used herein, "filament" refers to monofilaments, multifilaments, extruded films, fibers, yarns, such as, for example, tape yarns, fibrillated tape yarn, slit-film yarn, continuous ribbon, and/or other fibrous materials used to form synthetic grass blades or strands of an artificial turf field.

Reference will now be made in detail to embodiments of artificial turf filaments and artificial turfs incorporating such filaments. In one or more embodiments, the artificial turf filament is formed from a formulation comprising an ethylene-based polymer having a density 0.900 g/c to 0.955 g/cc and a melt index ($I_2$) of 0.1 g/10 min to 20 g/10 min as measured according to ASTM D1238 (at 190° C., 2.16 kg), and one or more polydimethylsiloxane (PDMS) components having a number average molecular weight ($M_n$) of from 10,000 g/mol to 500,000 g/mol, wherein the $M_n$ is measured by Gel Permeation Chromatography (GPC).

The artificial turf may comprise a primary backing having a top side and a bottom side, and one or more of these artificial turf filaments, The artificial turf filaments may be affixed to the primary backing such that the at least one artificial turf filament provides a tufted face extending outwardly from the top side of the primary backing. Moreover, the artificial turf field may comprise a secondary backing bonded to at least a portion of the bottom side of the primary backing such that the at least one artificial turf filament is affixed in place to the bottom side of the primary backing.

Base Ethylene-Based Polymer

The ethylene-based polymer, which may also be called the base ethylene-based polymer, may have a density of 0.900 g/cc to 0.955 g/cc. All individual values and subranges of at least 0.900 g/cc to 0.955 g/cc are included and disclosed herein. For example, in some embodiments, the ethylene-based polymer has a density of 0.900 to 0.945 g/cc, 0.900 to 0.940 g/cc, 0.900 to 0.935 g/cc, 0.910 g/cc to 0.945 g/cc, 0.910 to 0.940 g/cc, 0.910 to 0.935 g/cc, 0.910 to 0.930 g/cc, 0.915 to 0.940 g/cc, 0.915 to 0.923 g/cc. The density may be measured in accordance with ASTM D792.

The ethylene-based polymer may have a melt index, I2, of 0.1 g/10 min to 20 g/10 min. All individual values and subranges of at least 0.1 g/10 min to 20 g/10 min are included and disclosed herein. For example, in some embodiments, the ethylene-based polymer may have a melt index, $I_2$, of 0.1 g/10 min to 10.0 g/10 min, 0.1 g/10 min to 9.5 g/10 min, 0.1 g/10 min to 9.0 g/10 min, 0.1 g/10 min to 5 g/10 min, 0.5 g/10 min to 6 g/10 min, 1 g/10 min to 5 g/10 min, 1.5 g/10 min to 4.5 g/10 min, or 2 g/10 min to 4 g/10 min. As stated above, the melt index, $I_2$, may be measured in accordance with ASTM D1238 (190° C. and 2.16 kg).

In embodiments herein, the ethylene-based polymer may have a melt flow ratio, $I_{10}/I_2$, of less than 14. All individual values and subranges of less than 14 are included and disclosed herein. For example, in some embodiments, the ethylene-based polymer may have a melt flow ratio, 110/12, of less than 13.5, 13, 12.5, 10, or even 7.5. In other embodiments, the ethylene-based polymer may have a melt flow ratio, $I_{10}/I_2$, of from 1.0 to 14, 2 to 14, 4 to 14, 5 to 14, 5.5 to 14, 6 to 14, 5 to 13.5, 5 to 13, 5 to 12.5, 5 to 12, 5 to 11.5, 5 to 11, 5.5 to 13.5, 5.5 to 13, 5.5 to 12.5, 5.5 to 12, 5.5 to 11.5, 5.5 to 11, 6 to 13.5, 6 to 13, 6 to 12.5, 6 to 12, 6 to 11.5, 6 to 11, or 6 to 8. Melt index, $I_{10}$, may be measured in accordance with ASTM D1238 (190° C. and 10.0 kg).

Moreover, the ethylene-based polymer may have a molecular weight distribution ($M_w/M_n$) in the range of from 2.0 to 8.0. All individual values and subranges from 2.0 to 3.5 are included and disclosed herein; for example, the molecular weight distribution ($M_w/M_n$) can range from a lower limit of 2, 2.1, 2.2, 2.4, 2.5, or 2.6 to an upper limit of 2.2, 2.3, 2.4, 2.5, 2.7, 2.9, 3.2, 3.5, 4.0, or 8.0. For example, the molecular weight distribution ($M_w/M_n$) can be from 2.0 to 3.5, or in the alternative, from 2.0 to 2.4, or in the alternative, from 2.0 to 2.8, or in the alternative, from 2.8 to 3.5.

Suitable comonomers for the ethylene-based polymer may include $C_{3-20}$ α-olefin comonomers. Exemplary α-olefin comonomers include, but are not limited to, propylene 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene.

The ethylene-based polymer may be produced through various polymerization processes. For example, gas phase, bulk or slurry phase, solution polymerization or any combination thereof can be used. Polymerization can be a one stage or a two or multistage polymerization process carried out in at least one polymerization reactor. For two or multistage processes different combinations can be used, e.g. gas-gas phase, slurry-slurry phase, slurry-gas phase processes. Suitable catalysts can include Ziegler-Natta catalysts, bis(biphenylphenoxy) catalysts (also referred to as polyvalent aryloxyether catalysts), a single-site catalyst (metallocene or constrained geometry), or non-metallocene, metal-centered, heteroaryl ligand catalysts, or combinations thereof. In one embodiment, the ethylene-based polymer comprises an LLDPE.

Various incorporation levels of ethylene monomer and α-olefin comonomer are contemplated for the ethylene-based polymer. For example, the ethylene-based polymer may include at least 50% by mole ethylene monomer, or at least 60% by mole ethylene monomer, or at least 70% by mole ethylene monomer, or at least 80% by mole ethylene monomer, or at least 90% by mole ethylene monomer. Conversely, the ethylene-based polymer may comprise less than 50% by mole of the α-olefin comonomer. In further embodiments, the ethylene-based polymer may comprise from 1 to 40% by mole of the α-olefin comonomer, or from 1 to 30% by mole of the α-olefin comonomer or from 1 to 20% by mole of the α-olefin comonomer, or from 1 to 10% by mole of the α-olefin comonomer.

Various amounts of the ethylene-based polymer are contemplated in the formulation of the artificial turf filament. In one embodiment, the formulation comprises 80 wt. % to 99 wt. % ethylene-based polymer. In further embodiments, the formulation may comprise 85-99 wt. %, 90-99 wt. %, or 90-95 wt. % of the ethylene-based polymer.

In further embodiments, the base ethylene-based polymer may be a blend of ethylene based polymers, for example, LLDPE, HDPE, LDPE, or may be a blend of ethylene-based polymer and another polymer, such as polyamide, propylene-based polymer, polyester, ethylene vinyl acetate (EVA), ethylene vinyl alcohol (EVOH), ethylene acrylic acid (EAA), and ethylene maleic anhydride (EMA).

PDMS Components

Additionally, the artificial turf formulation also includes one or more PDMS components to aid in friction control of the artificial turf. As stated above, the PDMS component of the artificial turf may have an $M_n$ of from 10,000 g/mol to 500,000 g/mol.

In one or more embodiments, the PDMS components may comprise an utrahigh molecular weight (UHMW) PDMS component, a high molecular weight (HMW) PDMS component, or a blend of both. The UHMW PDMS component has a $M_n$ that is higher than the HMW PDMS component. In specific embodiments, the PDMS components may comprise a blend of an UHMW PDMS component and the HMW PDMS component.

In one or more embodiments, the UHMW PDMS component may comprise an $M_n$ of 150,000 to 450,000 g/mol, or from 200,000 to 400,000 g/mol, or from 250,000 to 350,000 g/mol. The HMW PDMS comprises an $M_n$ of 10,000 to 100,000 g/mol, or from 10,000 to 50,000 g/mol, or from 10,000 to 25,000 g/mol, or from 10,000 to 20,000 g/mol.

Moreover, the PDMS components may comprise siloxane blended with a polyolefin carrier e.g., a masterbatch PDMS component. The addition of the PDMS component can be done via masterbatch during extrusion or pre-compounded into a fully formulated product prior to extrusion. In one embodiment, the polyolefin carrier comprises an ethylene-based polymer, for example, LLDPE, or LDPE. Alternatively, the carrier can include other polyolefins, such as propylene-based polymer. Additionally, other components such as polyamide may be used in the carrier.

Various amounts of the PDMS components are contemplated within the artificial turf filament formulation. In one or more embodiments, the formulation may comprise 1-20 wt. %, 3-15 wt. %, 5-15 wt. %, or 5-10 wt. % of the one or more PDMS components. The amount of the PDMS component may be modified to tailor the friction performance of the yarn.

In specific embodiments utilizing the UHMW PDMS component, the formulation may include 0.5-10 wt %, or from 0.5 to 5 wt. %, or from 0.5-2.5 wt % of the UHMW PDMS component. When added as a masterbatch, the masterbatch May 1-99 wt % or from 25-50 wt %, or from 40 to 60 wt. %, or 50 wt % of the UHMW PDMS component.

In specific embodiments utilizing the HMW PDMS component, the formulation may include 0.5-10 wt %, or from 0.5 to 5 wt. %, or from 0.5-2.5 wt % of the HMW PDMS component. When added as a masterbatch, the masterbatch May 1-99 wt % or from 10-40 wt %, or from 20 to 40 wt. %, or 25 wt % HMW PDMS.

In embodiments wherein the PDMS components is a blend of HMW PDMS and UHMW PDMS components, various amounts of each component are contemplated within the overall PDMS component. In one or embodiments, the PDMS blend may comprise from 10-90 wt %, from 25-75 wt %, or from 50-75 wt % of the HMW PDMS component. Conversely, the PDMS blend may comprise from 10-90 wt %, or from 25-75 wt %, or from 25-50 wt % of the UHMW PDMS component.

Additives

Optionally, the filaments may further include one or more additives. Nonlimiting examples of suitable additives include antioxidants, pigments, colorants, UV stabilizers, UV absorbers, curing agents, cross linking co-agents, boosters and retardants, processing aids, fillers, coupling agents, ultraviolet absorbers or stabilizers, antistatic agents, nucleating agents, slip agents, plasticizers, lubricants, viscosity control agents, tackifiers, anti-blocking agents, surfactants, extender oils, acid scavengers, and metal deactivators. In an embodiment, colorant, such as SICOLEN™ green 85-125345 (available from BASF), may be added in an amount of less than about 10 wt. %, less than about 8 wt. %, less than about 6 wt. %, or even less than about 4 wt. %. In another embodiment, a processing aid, such as ARX-741 (available from *Argus*), may be added in an amount of less than about 2 wt. %, less than about 1.5 wt. %, or even less than about 1 wt. %. Additives can be used in amounts ranging from about 0.001 wt. % to more than about 10 wt. % based on the weight of the formulation.

Artificial Turf

Referring to FIG. 1, the artificial turf field 100 comprises a primary backing 105 having a top side 110 and a bottom side 115, and at least one artificial turf filament 120. As shown the at least one artificial turf filament 120 is affixed to the primary backing 105 such that the at least one artificial turf filament 120 provides a tufted face extending outwardly from the top side 110 of the primary backing 105.

As used herein, "affix," "affixed," or "affixing" includes, but is not limited to, coupling, attaching, connecting, fastening, joining, linking or securing one object to another object through a direct or indirect relationship. The tufted face extends from the top side of the primary backing, and can have a cut pile design, where the artificial turf filament loops may be cut, either during tufting or after, to produce a pile of single artificial turf filament ends instead of loops.

Referring again to FIG. 1, the artificial turf field 100 may further comprise a secondary backing 130 bonded to at least a portion of the bottom side 115 of the primary backing 105 such that the at least one artificial turf filament 120 is affixed in place to the bottom side 115 of the primary backing 105.

In alternative embodiments, the artificial turf filament 120 may have a multilayer multilayer yarn structure, where the outer layer comprises the above-described formulation to control friction and the inner layer comprises standard turf resin. Standard turf resin may include polyolefins, polyamides, polyesters, or combinations thereof.

The primary backing 105 can include, but is not limited to, woven, knitted, or non-woven fibrous webs or fabrics made of one or more natural or synthetic fibers or yarns, such as polypropylene, polyethylene, polyamides, polyesters, and rayon. The secondary backing 130 may comprise polyurethane (including, for example, polyurethane supplied under the name ENFORCER™ or ENHANCER™ available from The Dow Chemical Company, Midland, MI) or latex-based materials, such as, styrene-butadiene latex, or acrylates.

The primary backing 105 and/or secondary backing 130 may have apertures through which moisture can pass. The apertures may be generally annular in configuration and are spread throughout the primary backing and/or secondary backing. Of course, it should be understood that there may be any number of apertures, and the size, shape and location of the apertures may vary depending on the desired features of the artificial turf field.

The artificial turf field 100 may be manufactured by providing at least one artificial turf filament as described herein and affixing the at least one artificial turf filament to a primary backing such that that at least one artificial turf filament provides a tufted face extending outwardly from a top side of the primary backing. The artificial turf field may further be manufactured by bonding a secondary backing to at least a portion of the bottom side of the primary backing such that the at least one artificial turf filament is affixed in place to the bottom side of the primary backing.

The artificial turf field 100 may optionally comprise a shock absorption layer underneath the secondary backing of the artificial turf field. The shock absorption layer can be made from polyurethane, PVC foam plastic or polyurethane foam plastic, a rubber, a closed-cell crosslinked polyethylene foam, a polyurethane underpad having voids, elastomer foams of polyvinyl chloride, polyethylene, polyurethane, and polypropylene. Non-limiting examples of a shock absorption layer are DOW® ENFORCER™ Sport Polyurethane Systems, and DOW® ENHANCER™ Sport Polyurethane Systems.

The artificial turf field 100 may optionally comprise an infill material. Suitable infill materials include, but are not limited to, mixtures of granulated rubber particles like SBR (styrene butadiene rubber) recycled from car tires, EPDM (ethylene-propylene-diene monomer), other vulcanized rubbers or rubber recycled from belts, thermoplastic elastomers (TPEs) and thermoplastic vulcanizates (TPVs).

The artificial turf field 100 may optionally comprise a drainage system. The drainage system allows water to be removed from the artificial turf field and prevents the field from becoming saturated with water. Nonlimiting examples of drainage systems include stone-based drainage systems, EXCELDRAIN™ Sheet 100, EXCELDRAIN™ Sheet 200, AND EXCELDRAIN™ EX-T STRIP (available from American Wick Drain Corp., Monroe, N.C.).

Process for Making Artificial Turf Filaments

Similarly, other embodiments relate to methods of manufacturing an artificial turf. The artificial turf filaments described herein may be made using any appropriate process for the production of artificial turf filament from the above described formulations.

The present artificial turf filaments may be made by extrusion, specifically by mixing the base ethylene-based polymer and the one or more PDMS components. Suitable artificial turf filament extruders may be equipped with a single general purpose screw and a melt pump ("gear pump" or "melt pump") to precisely control the consistency of polymer volume flow into the die. Artificial turf filament dies may have multiple single holes for the individual filaments distributed over a circular or rectangular spinplate. The shape of the holes corresponds to the desired filament cross-section profile, including for example, rectangular, dog-bone, v-shaped, and Mexican hat. A standard spinplate has 50 to 160 die holes of specific dimensions. Lines can have output rates from 150 kg/h to 350 kg/h.

The artificial turf filaments may be extruded into a water bath with a die-to-water bath distance of from 16 to 40 mm. Coated guiding bars in the water redirect the filaments towards the first takeoff set of rollers. The linear speed of this first takeoff set of rollers may vary from 15 to 70 m/min. The first takeoff set of rollers can be heated and used to preheat the filaments after the waterbath and before entering the stretching oven. The stretching oven may be a heated air or water bath oven. The filaments may be stretched in the stretching oven to a predetermined stretched ratio. In some embodiments, the stretch ratio is at least 4. In other embodiments, the stretch ratio is at least 4.5, 4.8, 5.0, 5.2, or 5.5. The stretching ratio is the ratio between the speed of the second takeoff set of rollers after the stretching oven and the speed of the first takeoff set of rollers before the stretching oven. The second takeoff set of rollers may be run at a different (higher or lower) speed than the first set of rollers.

After the filaments are passed over the second takeoff set of rollers, they are then drawn through a set of three annealing ovens. The three annealing ovens may be either a hot air oven with co- or countercurrent hot air flow, which can be operated from 50 to 150° C. or a hot water-oven, wherein the filaments are oriented at temperatures from 50 to 98° C. At the exit of the first annealing oven, the filaments are passed onto a third set of rollers that may be run at a different (higher or lower) speed than the second set of rollers. The linear velocity ratio of the third set of rollers located after the oven to the second set of rollers located in front of the oven may be referred to as either a stretching or relaxation ratio. At the exit of the second annealing oven, the filaments are passed onto a fourth set of rollers that may be run at a different (higher or lower) speed than the third set of rollers. At the exit of the third annealing oven, the filaments are passed onto a fifth set of rollers that may be run at a different (higher or lower) speed than the fourth set of rollers.

The artificial turf filament may optionally undergo further post-extrusion processing (e.g., annealing, cutting, etc.).

The present artificial turf filaments may be defined by various properties. In some embodiments herein, the artificial turf filaments may exhibit a shrink of less than 6.0%. All individual values and subranges of less than 6.0% are included and disclosed herein. For example, in some embodiments, the artificial turf filaments may exhibit a shrink lower than 5.8, 5.5%, 5.3%, 5.2%, 5.0%, or lower. In yet other embodiments herein, the artificial turf filament may exhibit an elongation of at least 50%.

Test Methods

The following test methods were used in the present application including the Examples that follow.

Density

Density is measured according to ASTM D792, and is reported in grams per cubic centimeter ($g/cm^3$ or g/cc).

Melt Index

Melt index, or $I_2$, is measured according to ASTM D1238 at 190° C. and 2.16 kg, and is reported in grams eluted per 10 minutes. Melt index, or $I_{10}$, is measured in accordance with ASTM D1238 at 190° C. and 10 kg.

Shrinkage

The shrinkage for the filaments is measured by cutting 50 meters of filament having a size of 2000 dtex and introducing to a hot air oven at 90° C. for 2 minutes. Thermal shrinkage is expressed as the percentage of length reduction before and after the heat treatment: Thermal shrinkage= (length before−length after)/length before*100%.

Tenacity and Elongation

Tenacity is determined using a Zwick tensile tester, operating on a 250 mm length of the monofilament, and using an extension speed of 250 mm/minute until the filament breaks. The tenacity (in cN/dtex) is the tensile stress (in cN) at break divided by the linear weight (in dtex). Elongation is the strain at break.

Tip Curl

For the tip curl test, yarn is cut and introduced in an oven at 90° C. for 5 minutes. The shape of the filaments is visually observed after the heat treatment and rated form 1 (best) to 4 (worst).

Skin Friction

The skin friction test is conducted on a friction machine developed by LABOSPORT. During the test, an instrumented friction tool is moved over the turf system sample to be tested. The mass and the linear speed of the tool are defined and controlled. The sliding tool has a mass of 75 kg and is sliding at different, pre-set speeds on the surface:

these conditions are considered representative of a running athlete falling on the sport surface. The temperature generated by the friction tool is recorded during the movement and samples are characterized by their peak temperature generated by friction. The aim of the test is to be a comparative test. Testing tool used for the friction is not representative of real human skin. Temperature increase during friction is measured, not the mechanical abrasion of a skin. The samples are compared on the basis of temperature increase during the friction. They are not compared based on "mechanical abrasion of the skin."

Ball Roll

The ball roll test was measured according to FIFA standard (FIFA Test Method 17 in FIFA Handbook of Test Methods, 2015). A ball is rolled through a ramp and travels through two sets of timing gates which calculate the ball speed over a known surface. Initial speed is recorded at timing gate 1 and the final speed at timing gate 2 by using the relationship between time and distance (speed=distance/time). Specific calculations to get the final ball roll are described in the FIFA Handbook of Test Methods October 2015 Edition.

Gel Permeation Chromatography

The Gel Permeation Chromatography (GPC) system consists of a Waters (Milford, Mass) 150 C high temperature chromatograph (other suitable high temperatures GPC instruments include Polymer Laboratories (Shropshire, UK) Model 210 and Model 220) equipped with an on-board differential refractometer (RI) (other suitable concentration detectors can include an IR4 infra-red detector from Polymer ChAR (Valencia, Spain)). Data collection is performed using Viscotek TriSEC software, Version 3, and a 4-channel Viscotek Data Manager DM400. The system is also equipped with an on-line solvent degassing device from Polymer Laboratories (Shropshire, United Kingdom).

Suitable high temperature GPC columns can be used such as four 30 cm long Shodex HT803 13 micron columns or four 30 cm Polymer Labs columns of 20-micron mixed-pore-size packing (MixA LS, Polymer Labs). The sample carousel compartment is operated at 140° C. and the column compartment is operated at 150° C. The samples are prepared at a concentration of 0.1 grams of polymer in 50 milliliters of solvent. The chromatographic solvent and the sample preparation solvent contain 200 ppm of trichlorobenzene (TCB). Both solvents are sparged with nitrogen. The polyethylene samples are gently stirred at 160° C. for four hours. The injection volume is 200 microliters. The flow rate through the GPC is set at 1 ml/minute.

The GPC column set is calibrated by running 21 narrow molecular weight distribution polystyrene standards. The molecular weight (MW) of the standards ranges from 580 to 8,400,000, and the standards are contained in 6 "cocktail" mixtures. Each standard mixture has at least a decade of separation between individual molecular weights. The standard mixtures are purchased from Polymer Laboratories. The polystyrene standards are prepared at 0.025 g in 50 mL of solvent for molecular weights equal to or greater than 1,000,000 and 0.05 g in 50 mL of solvent for molecular weights less than 1,000,000. The polystyrene standards were dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weight using the following Equation (as described in Williams and Ward, J. Polym. Sci., Polym. Letters, 6, 621 (1968)):

$$M_{polyethylene} = A \times (M_{polystyrene})^B,$$

where M is the molecular weight of polyethylene or polystyrene (as marked), and B is equal to 1.0. It is known to those of ordinary skill in the art that A may be in a range of about 0.38 to about 0.44 and is determined at the time of calibration using a broad polyethylene standard. Use of this polyethylene calibration method to obtain molecular weight values, such as the molecular weight distribution (MWD or $M_w/M_n$), and related statistics (generally refers to conventional GPC or cc-GPC results), is defined here as the modified method of Williams and Ward.

EXAMPLES

The following conducted examples illustrate one or more of the features of the present disclosure. The examples of the instant invention demonstrate the improved friction control produced by the present formulations of the artificial turf filaments. The polymer components used in the Examples are provided as follows.

The UHMW PDMS component was MB50-613, a UHMW PDMS masterbatch comprising 50 wt. % silicone gum with an $M_n$=300,000 g/mol in a DOWLEX™ 2035G LLDPE carrier. The DOWLEX™ 2035G has a density=0.919 g/cc, and melt index $I_2$=6.0 g/10 min. The MB50-613 masterbatch is produced by the Dow Chemical Company, Midland, MI.

The HMW PDMS component was MB25-502, a HMW PDMS masterbatch containing 25 wt % of siloxane content, and $M_n$=17,000 g/mol, dispersed in an LDPE carrier having an $I_2$ of 8 g/10 min. The MB25-502 masterbatch is produced by the Dow Chemical Company, Midland, MI.

The base ethylene-based polymer was an ethylene-hexene copolymer prepared via solution polymerization process in the presence of a catalyst system comprising a metal complex of a polyvalent aryloxyether having a melt index ($I_2$) of approximately 3.2 g/10 minutes, an $I_{10}/I_2$ of 6.5, and a density of approximately 0.918 g/cm³. Specifically, the solution polymerization occurs in a single loop reactor system as described in U.S. Pat. No. 5,977,251 in the presence of a catalyst system comprising a procatalyst represented by the following formula:

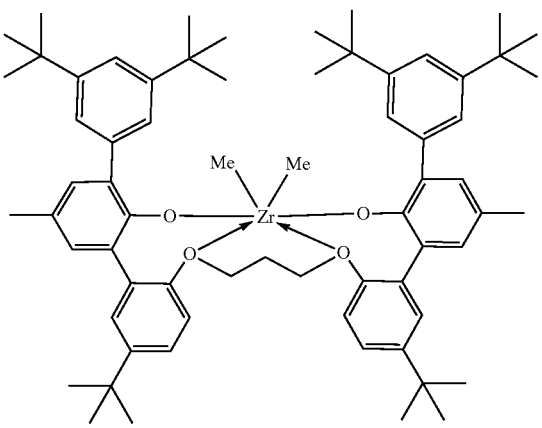

The polymerization conditions for the example ethylene-based polymer are reported in Tables 1 and 2. Referring to Tables 1 and 2, TEA is triethylaluminum and PETROSOL D 100/120 is a solvent which is commercially available from CEPSA (Compañía Española de Petróleos, S.A.U., Madrid, Spain).

The polymerization conditions for the example ethylene-based polymer is reported in Tables 1 and 2. GPC properties of the produced base ethylene-based polymer are provided in Table 3.

TABLE 1

| 1. REACTOR FEEDS | Units | Ethylene-based polymer |
|---|---|---|
| Reactor Solvent/Ethylene Feed Flow ratio | g/g | 4.05 |
| Solvent Type Used | | PETROSOL D 100/120 |
| Comonomer Type Used | | 1-Hexene |
| Reactor Comonomer/Ethylene Feed Flow ratio | g/g | 0.257 |
| Reactor Fresh Hydrogen/ethylene Feed Flow ratio | g/kg | 0.111 |
| Reactor Control Temperature | ° C. | 155 |
| Reactor Pressure (gauge) | bar | 51.7 |
| Reactor Ethylene Conversion | % | 86.5 |

TABLE 1-continued

| 1. REACTOR FEEDS | Units | Ethylene-based polymer |
|---|---|---|
| Reactor Residence Time | min | 6.7 |
| Recycle Ratio | | 4.3 |

TABLE 2

| 3. CATALYST | Ethylene-based polymer |
|---|---|
| Reactor Co-Catalyst-1/Catalyst Molar feed Ratio | 3.0 |
| Reactor Co-Catalyst-1 Type | bis(hydrogenated tallow alkyl)methyl, tetrakis(pentafluorophenyl)borate(1-)amine |
| Reactor Co-Catalyst-2/Catalyst Molar Ratio | 33 |
| Reactor Co-Catalyst-2 Type | TEA |

TABLE 3

| | $M_n$ (g/mol) | $M_w$ (g/mol) | $M_z$ (g/mol) | $M_w/M_n$ |
|---|---|---|---|---|
| Ethylene-based polymer | 34300 | 75000 | 136000 | 2.19 |

The sample formulations are shown in Table 4. All samples were weighted down to include 5% of color masterbatch (Sicolen 95-133805 from BASF) and 1% of processing aid (ARX 741).

TABLE 4

| Example | Ethylene-based polymer (wt. %) | UHMW PMDS (wt.%) | HMW PMDS (wt.%) | Silicone (wt. %) |
|---|---|---|---|---|
| Comparative Example 1 (CE1) | 100% | — | — | 0 |
| Inventive Example 1 (IE1) | 95% | 5 | — | 2.5 |
| Inventive Example 2 (IE2) | 98% | — | 2 | 0.5 |
| Inventive Example 3 (IE3) | 90% | — | 10 | 2.5 |
| Inventive Example 4 (IE4) | 92.5% | 2.5 | 5 | 2.5 |

To make the artificial turf filaments, the above mentioned formulations were extruded in a compact monofilament extrusion line at Oerlikon Barmag (Chemnitz, Germany). Yarns of target 2000 dtex were produced. Table 5 summarizes the processing conditions.

TABLE 5

| Sample | total stretch | total relax | overall ratio | P1 [bar] | P2 [bar] | P3 [bar] | Tmelt [° C.] | TWB [° C.] | oven2 [° C.] | oven3 [° C.] | oven4 [° C.] |
|---|---|---|---|---|---|---|---|---|---|---|---|
| CE1 | 4.96 | 0.74 | 3.65 | 80 | 50 | 148 | 229.2 | 35 | 100 | 127 | 120 |
| IE1 | 4.97 | 0.70 | 3.45 | 81 | 50 | 142 | 226.2 | 35 | 100 | 127 | 120 |
| IE2 | 4.97 | 0.74 | 3.66 | 82 | 50 | 150 | 225.7 | 35 | 100 | 127 | 120 |
| IE3 | 4.97 | 0.74 | 3.66 | 83 | 50 | 150 | 210.3 | 35 | 100 | 127 | 120 |
| IE4 | 4.97 | 0.69 | 3.45 | 83 | 50 | 151 | 223.3 | 35 | 100 | 127 | 120 |

The results of the filament properties are provided in Table 6 below.

TABLE 6

| Sample | Line speed m/min | dtex | Shrinkage, % | Tenacity cN/dtex | Elongation, % | Ten*Elo (IEx vs CE), % | Tip Curl |
|---|---|---|---|---|---|---|---|
| CE1 | 140 | 2007 | 6.5 | 1.05 | 84 | 0 | 1 |
| IE1 | 140 | 2006 | 5.6 | 1.06 | 99 | 19.0 | 1 |
| IE2 | 140 | 1953 | 5.8 | 1.15 | 87 | 13.4 | 1 |
| IE3 | 120 | 2064 | 5.6 | 1.12 | 84 | 6.7 | 1 |
| IE4 | 140 | 1963 | 4.7 | 1.06 | 95 | 14.2 | 1 |

As shown in Table 6, the addition of HMW PDMS improved the filament properties over comparative example CE1 by reducing the shrinkage and offering a broader annealing window. This means that the monofilament extrusion process can be run at higher line speeds without being limited by excessive shrinkage of the filaments during the tufting process. Therefore, the inventive examples allowed for an increase operation window for the filament fabrication Tensile properties of filaments such as tenacity and elongation were maintained or improved for the inventive examples (IE1-IE4). Example IE4, which is a combination of the two UHMW and HMW PDMS masterbatches, delivered outstanding shrinkage performance and better tenacity and elongation than the ethylene-based polymer alone (CE1).

Skin Friction Testing

Skin friction testing was conducted at Labosport. The test is considered representative of a fall mode of an athlete over a turf field surface. Results are shown in Table 7 below. The inventive examples containing PDMS showed a temperature reduction between 1° and 20° C. at low speeds, and around 10° C. at higher speeds. IE4, which included a combination of the UHMW and HMW PDMS components, showed a significant temperature reduction over the entire speed range.

TABLE 7

| Speed   | CE    | IE1  | IE2  | IE3  | IE4  |
|---------|-------|------|------|------|------|
| 0.5 m/s | 71.4  | 55.0 | 62.3 | 52.8 | 52.3 |
| 1.5 m/s | 95.1  | 75.6 | 83.4 | 75.1 | 72.4 |
| 3.0 m/s | 100.0 | 94.0 | 89.0 | 96.8 | 88.8 |

Ball Roll Testing

Ball roll testing was also conducted at Labosport. In this test, a ball was released horizontally on a controlled manner and the distance to stopping is recorded. Three repetitions were done and the average is calculated. The FIFA Quality Pro required range for ball roll is between 4 and 8 meters of rolling.

TABLE 8

| Example | Rolling meters, m |
|---------|-------------------|
| CE1     | 6.97              |
| IE2     | 6.86              |
| IE4     | 8.74              |

As shown in Table 8 above, it can be observed that IE4 showed a significantly higher ball roll versus the comparative example (CE1), even falling above the maximum requirement for FIFA Quality PRO. This means that the formulation could provide benefits in water savings in some sports like hockey where water is used to improve the ball rolling.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An artificial turf filament formed from a formulation comprising:
   90 to 98 weight percent based on a total weight of the formulation of an ethylene-based polymer having a density 0.900 g/c to 0.955 g/cc and a melt index ($I_2$) of 0.1 g/10 min to 20 g/10 min as measured according to ASTM D1238 (at 190 C, 2.16 kg),
   from 0 to 2.5 weight percent based on the total weight the formulation of a first polydimethylsiloxane having a number average molecular weight (Mn) of 300,000 g/mol; and
   from 0 to 2.5 weight percent based on the total weight of the formulation of a second polydimethylsiloxane having a number average molecular weight (Mn) of 17,000 g/mol, wherein each Mn is measured by Gel Permeation Chromatography (GPC); and
   wherein the sum of the amounts of the first and second polydimethylsiloxanes is from 0.5 to 2.5 weight percent based on a total weight of the formulation.

2. The artificial turf filament of claim 1, wherein the ethylene-based polymer has a density of from 0.918 g/cm$^3$ to 0.930 g/cm$^3$ and a melt index of 0.8 to 6 g/10 min as measured according to ASTM D1238 (at 190 C, 2.16 kg).

3. The artificial turf filament of claim 1, wherein the ethylene-based polymer has an $I_{10}/I_2$ of 6.5, a density of 0.918 g/cm$^3$ and a melt index of 3.2 g/10 min as measured according to ASTM D1238 (at 190 C, 2.16 kg).

4. An artificial turf comprising:
   a primary backing having a top side and a bottom side; and
   at least one artificial turf filament according to claim 1;
   wherein the at least one artificial turf filament is affixed to the primary backing such that the at least one artificial turf filament provides a tufted face extending outwardly from the top side of the primary backing.

5. The artificial turf of claim 4, wherein the artificial turf further comprises a secondary backing bonded to at least a portion of the bottom side of the primary backing such that the at least one artificial turf filament is affixed in place to the bottom side of the primary backing.

6. The artificial turf filament of claim 1 wherein the first polydimethylsiloxane is present as a 50 wt % masterbatch in an linear low-density polyethylene carrier.

7. The artificial turf filament of claim 6 wherein the carrier has a density of 0.919 g/cc and a melt index ($I_2$) of 6.0 g/10 min.

8. The artificial turf filament of claim 1 wherein the second polydimethylsiloxane is present as a 25 wt % masterbatch in a low density polyethylene carrier.

9. The artificial turf filament of claim 8 wherein the carrier has a melt index ($I_2$) of 8.0 g/10 min.

10. The artificial turf filament of claim 1 wherein
    the first polydimethylsiloxane is present as a 50 wt % masterbatch in an linear low-density polyethylene carrier that has a density of 0.919 g/cc and a melt index ($I_2$) of 6.0 g/10 min; and
    the second polydimethylsiloxane is present as a 25 wt % masterbatch in a low density polyethylene carrier that has a melt index (12) of 8.0 g/10 min.

11. The artificial turf filament of claim 10 wherein the ethylene-based polymer has an $I_{10}/I_2$ of 6.5.

12. The artificial turf filament of claim 1 wherein
    the ethylene-based polymer is present in an amount of 95 wt % based on a total weight of the formulation; and
    the first polydimethylsiloxane is present in an amount of 2.5 wt % based on a total weight of the formulation.

13. The artificial turf filament of claim 12 wherein
    the first polydimethylsiloxane is present as a 50 wt % masterbatch in an linear low-density polyethylene carrier that has a density of 0.919 g/cc and a melt index ($I_2$) of 6.0 g/10 min; and
    the ethylene-based polymer has an $I_{10}/I_2$ of 6.5.

14. The artificial turf filament of claim 1 wherein
    the ethylene-based polymer is present in an amount of 98 wt % based on a total weight of the formulation; and
    the second polydimethylsiloxane is present in an amount of 0.5 wt % based on a total weight of the formulation.

15. The artificial turf filament of claim 14 wherein
    the second polydimethylsiloxane is present as a 25 wt % masterbatch in a low density polyethylene carrier that has a melt index ($I_2$) of 8.0 g/10 min; and
    the ethylene-based polymer has an $I_{10}/I_2$ of 6.5.

16. The artificial turf filament of claim 1 wherein
    the ethylene-based polymer is present in an amount of 90 wt % based on a total weight of the formulation; and
    the second polydimethylsiloxane is present in an amount of 2.5 wt % based on a total weight of the formulation.

17. The artificial turf filament of claim 16 wherein
the second polydimethylsiloxane is present as a 25 wt % masterbatch in a low density polyethylene carrier that has a melt index ($I_2$) of 8.0 g/10 min; and
the ethylene-based polymer has an $I_{10}/I_2$ of 6.5.

18. The artificial turf filament of claim 1 wherein
the ethylene-based polymer is present in an amount of 92.5 wt % based on a total weight of the formulation;
the first polydimethylsiloxane is present in an amount of 1.25 wt % based on a total weight of the formulation; and
the second polydimethylsiloxane is present in an amount of 1.25 wt % based on a total weight of the formulation.

19. The artificial turf filament of claim 18 wherein
the first polydimethylsiloxane is present as a 50 wt % masterbatch in an linear low-density polyethylene carrier that has a density of 0.919 g/cc and a melt index ($I_2$) of 6.0 g/10 min;
the second polydimethylsiloxane is present as a 25 wt % masterbatch in a low density polyethylene carrier that has a melt index ($I_2$) of 8.0 g/10 min; and
the ethylene-based polymer has an $I_{10}/I_2$ of 6.5.

* * * * *